US008505806B2

(12) United States Patent
Totino et al.

(10) Patent No.: US 8,505,806 B2
(45) Date of Patent: Aug. 13, 2013

(54) ZIRCONIUM-COATED STEEL PLATES AND CHEMICAL DEVICE ELEMENTS PRODUCED WITH SUCH PLATES

(75) Inventors: Ernest Totino, Sainte Ruffine (FR); Emmanuel Kelbert, Nancy (FR)

(73) Assignee: Mersen France PY SAS, Pagny sur Moselle (FR)

( * ) Notice: Subject to any disclaimer, the term of this patent is extended or adjusted under 35 U.S.C. 154(b) by 796 days.

(21) Appl. No.: 11/817,660

(22) PCT Filed: Mar. 9, 2006

(86) PCT No.: PCT/FR2006/000519
§ 371 (c)(1),
(2), (4) Date: Jul. 9, 2008

(87) PCT Pub. No.: WO2006/095093
PCT Pub. Date: Sep. 14, 2006

(65) Prior Publication Data
US 2009/0136778 A1 May 28, 2009

(30) Foreign Application Priority Data
Mar. 9, 2005 (FR) ..................... 05 02351

(51) Int. Cl.
*B23K 31/02* (2006.01)
(52) U.S. Cl.
USPC ....................... 228/227; 228/254; 228/262.71
(58) Field of Classification Search
None
See application file for complete search history.

(56) References Cited

U.S. PATENT DOCUMENTS

| | | | | |
|---|---|---|---|---|
| 2,798,843 A * | 7/1957 | Slomin et al. | ................. | 205/170 |
| 2,908,966 A * | 10/1959 | Wagner | ......................... | 428/656 |
| 2,985,955 A * | 5/1961 | Rostoker et al. | ............. | 228/175 |
| 3,106,773 A | 10/1963 | Donald et al. | | |
| 3,581,382 A * | 6/1971 | Wells et al. | ................... | 228/198 |
| 3,730,761 A * | 5/1973 | Smith | ........................... | 427/601 |
| 3,885,922 A * | 5/1975 | Thomas et al. | ............... | 428/683 |
| 4,073,427 A | 2/1978 | Keifert et al. | | |
| 4,291,104 A | 9/1981 | Keifert | | |
| 4,352,714 A * | 10/1982 | Patterson et al. | ............... | 216/33 |
| 6,090,709 A * | 7/2000 | Kaloyeros et al. | ............ | 438/685 |
| 6,575,353 B2 * | 6/2003 | Palmgren | ..................... | 228/245 |
| 2002/0079355 A1 * | 6/2002 | Totino et al. | .................. | 228/245 |
| 2002/0130108 A1 * | 9/2002 | Makino | ......................... | 218/118 |
| 2003/0160088 A1 * | 8/2003 | Mitten et al. | ................... | 228/219 |
| 2003/0201037 A1 * | 10/2003 | Totino et al. | .................. | 148/528 |
| 2004/0065392 A1 * | 4/2004 | Totino et al. | .................. | 148/528 |
| 2004/0105999 A1 | 6/2004 | Abkowitz et al. | | |
| 2006/0045785 A1 * | 3/2006 | Hu et al. | ........................... | 419/5 |
| 2009/0136778 A1 * | 5/2009 | Totino et al. | .................. | 428/660 |

FOREIGN PATENT DOCUMENTS

| | | | |
|---|---|---|---|
| GB | 874271 A | | 8/1961 |
| JP | 51-012350 A | * | 1/1976 |
| JP | 04-046068 A | * | 2/1992 |
| JP | 10-236886 A | * | 9/1998 |
| WO | WO-03/097230 A | | 11/2003 |

OTHER PUBLICATIONS

Blank J-Y et al: "Fabrication Par Diffusion Eutectique De Jonctions Tubulaires Entre Aciers Inoxydables Austenitiques et Zirconium, Alliages de Zirconium Ou Titane", Memoires et Etudes Scientifiques De La Revue De Metallurgie, Revue De Mettalurgie, Paris, Fr, vol. 86, No. 6, Jun. 1, 1989, pp. 371-379, XP000053122, ISSN : 0245-8292.

Huet M Et Al : << Soudage-Diffusion Zircaloy 4/Acier Z2CN18-10 Avec Interposition De Metaux Intermediaires >>, Memoires Et Etudes Scientifiques De La Revue De Metallurgie, Revue De Metallurgie, Paris, Fr., vol. 85, No. 6, Jun. 1, 1988, pp. 313-325, XP000025560 ; ISSN : 0245-8292.

International Search Report No. PCT/FR2006/000519, Jul. 3, 2006, 3 pages.

* cited by examiner

*Primary Examiner* — Kiley Stoner
(74) *Attorney, Agent, or Firm* — Baker Donelson Bearman Caldwell & Berkowitz, PC

(57) ABSTRACT

Method for producing coated assembly parts for chemical device elements including the following series of steps:
(a) the formation of an initial assembly including a steel support part, typically a plate, a zirconium or zirconium alloy coating, typically a sheet having dimensions similar to those of the steel plate, and at least one brazing material between the support part and the coating, wherein said brazing material is an alloy including silver and copper;
(b) the insertion of the initial assembly into a brazing chamber with a controlled atmosphere;
(c) the formation of a controlled atmosphere in said chamber;
(d) the reheating of said assembly to a temperature at least equal to the melting temperature of said brazing material;
wherein, prior to the formation of said initial assembly, the deposition of a titanium or titanium alloy layer on said zirconium (or zirconium alloy) coating is performed, and in that said coating is placed so that its titanium- or (titanium alloy-) coated surface is in contact with said brazing material.

13 Claims, No Drawings

ZIRCONIUM-COATED STEEL PLATES AND CHEMICAL DEVICE ELEMENTS PRODUCED WITH SUCH PLATES

CROSS REFERENCE TO RELATED APPLICATIONS

This is a §371 National Stage Application of International Application No. PCT/FR2006/000519 filed Mar. 9, 2006, which claims priority from French Application No. 0502351 filed Mar. 9, 2005.

BACKGROUND OF THE INVENTION

1. Field of the Invention

This invention relates to a method for producing chemical device elements that are used to manipulate, store and/or treat highly corrosive products, for example, storage chambers, containers, reactors, mixers, treatment devices and devices for conveying raw or intermediate products. To ensure good corrosion resistance and in consideration of the cost of anticorrosion materials, chemical device elements usually comprise a steel support (carbon steel or stainless steel) which gives the assembly its mechanical strength and an anticorrosion metal coating based on a noble metal or on a reactive metal capable of providing a protective layer after reaction with the oxygen or with the corrosive environment concerned. For example, a material such as tantalum, tungsten, vanadium or alloys thereof, or, if conditions allow, reactive metals such as zirconium, titanium, hafnium or alloys thereof, are selected. Due to the cost of these materials, it is desirable to make the coatings as thin as possible.

This invention relates more specifically to chemical device elements comprising a thin zirconium coating having a thickness of typically less than 1 mm. It may also relate to the production of device elements internally coated with zirconium and used for storing, exploitation and/or transport of nuclear materials. We will hereinafter refer to the latter with the general term "nuclear devices."

2. Description of Related Art

It is possible to produce chemical device elements in a number of ways, whether by "lining" the inside of the chemical device once it has been completely formed, by depositing the coating on portions already formed, then assembling them, or by depositing the coating on plate- or tube-type semi-finished products, forming said semi-finished products thus coated, then assembling the various portions thus obtained.

In the first case, the lining can be made without a connection between the support and the coating ("loose-lining"). For example, a mechanical engagement can be provide between the coating and the support, by anchoring, in a limited number of assembly points. Such a technique in theory makes it possible to use anticorrosion coatings having a thickness of several hundred microns. However, for apparatuses subjected to significant mechanical stresses, the use of a coating having a low thickness is not desirable insofar as the coating is not closely attached to the substrate and risks being weakened, or even collapsing, when the chamber is subjected to a vacuum.

In other cases, a number of techniques for attaching the coating to the support are possible. It is possible to provide several spot welds, for example by seam welding, or to closely attach the coating and the support over the entirety or a large portion of their opposing surfaces, by explosion cladding or by melting of an intermediate brazing alloy layer. If spot seam welding is performed, it is possible to encounter excessive local deformations of the coating if it is too thin. Moreover, an inadequately supported coating can collapse if the chamber is in a vacuum. If the assembly is performed by explosion cladding, it is not possible in practice, i.e. with the standard shapes of chemical device elements to be coated, to control the propagation and the effect of the shock wave if the thickness of the coating is less than one millimeter, when the plate and its coating cover large surfaces, typically several square meters. If the attachment of the coating is performed by brazing, two techniques are possible: brazing the coating onto one portion of the device already formed (as in U.S. Pat. No. 4,291,104) or brazing the coating onto a plate which is then formed (as in WO 03 097230).

The method described in U.S. Pat. No. 4,291,104 (Keifert) consists of using a coating that is clearly thinner than the support, pre-deforming it so that it follows the shape imposed by the support, and to provide suitable locations for "convolutions" which make it possible to compensate for differential expansions, and placing said coating, then attaching it by brazing, onto the support. Although such a technique is suitable for handling a coating that is relatively thin with respect to the support, it requires the use of coatings that are not excessively fragile or excessively deformable during the handling necessary for placing the coating onto its support. These coatings must therefore have an adequate thickness, of which the value is a function of the shape of the coating pre-formed before its attachment to the support, and which is typically greater than 0.75 mm.

To ensure the cohesion of the assembly with a coating having a thickness of less than 1 mm, it is possible to consider using thermal spray technologies: plasma-assisted or non-plasma-assisted hot or cold spraying. However, while these technologies make it possible to obtain both good cohesion of the assembly and low noble metal consumption, they do not provide 100% assurance of the impermeability of the anticorrosion coating thus deposited, even if its porosity level is generally lower than the percolation threshold.

It has long been known that direct welding of zirconium on steel is very difficult. Patent GB 874 271 (inventor: Alan Garlick) proposes the use of two different intermediate metal layers between the zirconium and the steel: the steel plate is coated with vanadium, and the zirconium plate is coated with niobium or titanium; the thickness of each of these coatings is on the order of one millimeter. Intermediate metals have also been used to join two plates of zirconium or zircaloy to one another (see U.S. Pat. No. 3,106,773), but the thicknesses used were much lower: on each side, a thickness on the order of 5 to 500 nm for the titanium, and on the order of 300 to 500 nm the copper was used.

In patent application WO 03 097230, the applicant showed that it was advantageous to produce chemical device elements by using steel plates or sheets which are coated with a metal anticorrosion material by melting of an intermediate brazing alloy layer, forming the plates thus coated by plastic deformation, then welding them to one another so that the element obtained confers its final shape on the device. For economical and mechanical reasons (the support must be prevented from losing its mechanical characteristics during the brazing, for example by exceeding its austenitisation temperature), the brazing temperature must be as low as possible. For this reason, a brazing alloy well suited to the desired low temperatures, which includes silver and copper, and of which the melting temperature is below 900° C., is used. However, this type of alloy cannot be used to braze a zirconium coating because the zirconium reacts with the copper and the solder to produce fragilising compounds that significantly limit the ductility of these assemblies. This loss of ductility leads to decohesion of the coating during forming by plastic deformation of the assemblies (production of a dished bottom, for example) and the chemical device thus loses its corrosion resistance.

The applicant has attempted to develop a process making it possible to obtain chemical or nuclear device elements comprising a zirconium or zirconium alloy coating, which typically has a thickness of less than 1 mm, preferably less than 0.5 mm, or even 0.3 mm and which does not have any of the disadvantages of the methods of the prior art.

DETAILED DESCRIPTION OF THE INVENTION

A first object of the invention is a method for producing coated assembly parts intended, for example, for producing a chemical device element comprising a zirconium or zirconium alloy coating, wherein the assembly parts include a steel support part and at least one zirconium or zirconium alloy coating, which method includes the following series of steps:
(a) the formation of an initial assembly including a steel support part, typically a plate, a zirconium or zirconium alloy coating, typically a sheet having dimensions similar to those of the steel plate, and at least one brazing material between the support part and the coating, wherein said brazing material is an alloy including silver and copper;
(b) the insertion of the initial assembly into a brazing chamber with a controlled atmosphere;
(c) the formation of a controlled atmosphere in said chamber;
(d) the reheating of said assembly to a temperature at least equal to the melting temperature of said brazing material, so as to attach the zirconium coating to the support part.

Said method is characterised in that, prior to the formation of said initial assembly, the deposition of a titanium or titanium alloy layer on said zirconium or zirconium alloy coating is performed, and in that said coating is placed so that its titanium- or titanium alloy-coated surface is in contact with said brazing material.

The applicant has noted that the method of the invention makes it possible to solidly attach a zirconium or zirconium alloy coating, having a thickness of less than 1 mm, or even less than 0.5 mm, and, for some favourable shapes, less than or equal to 0.3 mm, to a steel part.

In this manner, the coated assembly part has sufficient ductility and can be subsequently shaped by plastic deformation (production of a dished bottom, for example). The steel support part and the zirconium or zirconium alloy coating typically have simple shapes (plate and sheet, for example), but they can optionally have been pre-deformed, in particular if the part to be produced has a portion that requires significant plastic deformation (folding or bending over a small radius, less than 5 times the thickness, for example).

The coating is made of pure Van Arkel zirconium, or, more generally, a zirconium alloy, typically an alloy used in the chemical or nuclear industry. In the chemical industry, a zirconium-hafnium alloy of the Zirconium 702 type (standard UNS R60702) or a zirconium-hafnium-niobium alloy of the Zirconium 705 type (standard UNS R60705) is generally used. In the nuclear industry, non-hafnate zirconium, for example a zirconium-tin alloy such as zircaloy 2 or zircaloy 4, or a zirconium-niobium alloy is used.

Owing to the method according to the invention, the capacity for shaping assemblies is obtained by modification of the zirconium or zirconium alloy coating surface which is intended to come into contact with the brazing material. This modification consists of depositing a titanium or titanium alloy layer of several microns, typically between 1 and 10 μm, preferably between 2 and 10 μm, more preferably between 2 and 7 μm and even more preferably between 3 and 6 μm on the surface of the coating. The deposition can be performed by cathode spraying in a chamber equipped with a cathode magnetron under a pressure of between $10^{-4}$ Torr and $10^{-2}$ Torr. The target is preferably pure titanium, typically pure to 99.995% or more, but it is possible to use titanium alloy targets including other elements such as vanadium, niobium, molybdenum or chromium, typically Ti—Al—V, Ti—Mo—Nb—Al—Si, Ti—Pd or Ti—V—Cr—Al alloys. Other deposition techniques can be considered, such as a plasma-assisted PVD (physical vapour deposition), a CVD (chemical vapour deposition) which can also be plasma-assisted, or a "cold spray"-type thermal spray deposition. Preferably, the zirconium or zirconium alloy sheet has previously been cleaned, degreased and the surface to be treated has been scoured by ionic scouring. The inventors have noted that it is advantageously possible to use thicker layers, with a possible thickness of up to 50 μm, but preferably less than 30 μm. This in particular enables other deposition techniques, such as plasma gun in vacuum conditions, to be used.

An initial assembly including a support part, typically a plate, made of steel, carbon steel or stainless steel, a zirconium or zirconium alloy sheet coated with a layer of titanium on the surface opposite the support and at least one brazing material between the support part and the coating. Said brazing material is an alloy including silver and copper, preferably easy to find on the market. The following can be cited, for example:
a binary Ag—Cu alloy having a composition similar to a eutectic composition (Ag 72%-Cu 28%), typically Ag between 67% and 75% and Cu complementary, of which the liquidus temperature is below 800° C. (melting temperature of the eutectic composition: 780° C.);
a ternary alloy also including zinc. Ternary alloys (silver-copper-zinc) are available on the market in a variety of forms. Silver is the predominant element. It enables the fluidity to be increased and the seam strength in particular with respect to alternating stresses to be improved. Silver also confers a ductility on the alloy which is used beneficially to deliver it in various forms (thin sheets, end fittings, rings, mesh, etc.) and thus adapt it to a wide variety of cases. The silver-copper-zinc ternary alloys, for example Ag 33%-Zn 33.5%-Cu 33.5% have a low liquidus temperature, capable of going below 730° C., with a relatively low solidification interval, typically on the order of 40° C.;
a quaternary alloy including silver, copper, zinc and tin, for example Ag 55%, Zn 22%, Cu 21% and Sn 2%. Silver-copper-zinc-tin quaternary alloys have a low liquidus temperature, on the order of 660° C. for the composition cited above, with a relatively low solidification interval (on the order of 30° C.). They are very fluid and provide resistant and non-fragile seams;
a quaternary alloy including silver, copper, zinc and cadmium, for example Ag 50%, Zn 16.5%, Cu 15.5 and Cd 18%. Silver-copper-zinc-cadmium quaternary alloys have a low liquidus temperature, on the order of 630° C. for the composition cited above, with a relatively low solidification interval (on the order of 20° C.). They are very fluid and provide resistant and non-fragile seams.

The initial assembly is inserted into a brazing chamber with a controlled atmosphere. The controlled atmosphere is preferably a relatively high vacuum: the chamber is typically pressurized at a pressure of between $10^{-5}$ and $10^{-3}$ mbars, that is, between $10^{-3}$ and $10^{-1}$ Pa. However, in particular when the weld contains metals that have a tendency to sublime, such as tin or zinc (risk of contamination of the load or the furnace during the treatment), it is preferable to use a neutral gas such as argon, nitrogen or an argon-nitrogen mixture as the controlled atmosphere, under a partial pressure typically between $5 \cdot 10^3$ and $10^4$ Pa. Before being inserted into the brazing chamber, said initial assembly is formed by bringing said plates and coated sheet together so as to obtain a space D which is preferably chosen so as to prevent the formation of gas bubbles or connection defects between the faying surfaces during the brazing operation. The space D is typically less than 0.1 mm. The zirconium sheet is placed so that the titanium or titanium alloy layer is in contact with the brazing material. The brazing material is preferably distributed uniformly between the support part and the anticorrosion coating so as to obtain a uniform connection layer and to increase the contact surface between said two elements. The brazing material is typically in the form of a powder, a strip or a mesh. In the tests, the applicant noted that the mesh had the advantage of effectively compensating for any variations in the space D between the faying surfaces.

When placed in the brazing chamber, the initial assembly is brought to a temperature slightly above the liquidus temperature of the brazing material, so that the brazing material melts and results in a close attachment with the element with which it is in contact. The brazing temperature is below around 900° C., preferably below the austenitisation temperature of the steel of the support, i.e., depending on the type of steel, below a temperature generally between 760° C. and 850° C.

The method advantageously includes the application of a plating pressure on said initial assembly during all or some of the brazing operation. More specifically, it is advantageous to apply a mechanical plating pressure on said assembly before and/or during said reheating. This plating pressure is exerted so that the support part and the anticorrosion coating are pressed tightly together so as to compress the brazing material, in particular enabling the desired value to be obtained for the space D between the support part and the coating. The plating pressure (also referred to as initial pressure), typically greater than 0.1 MPa, can be applied by a mechanical clamping system, such as a tie, spring and clamping plate system, or a pneumatic system such as an inflatable bag or a system using hydraulic cylinders. The low-temperature brazing operation limits degeneration of the mechanical clamping system.

Owing to the invention, it is unnecessary to form zirconium-copper compounds which fragilise the interface between the steel support and the zirconium coating. Therefore, the substrate/coating connection is sufficiently ductile to be capable of being shaped by plastic deformation after brazing.

The thickness of the titanium or titanium alloy layer deposited on the zirconium sheet preferably does not exceed 10 μm. It is typically between 1 and 10 μm, preferably between 2 and 10 μm, more preferably between 2 and 7 μm, and most preferably between 3 and 6 μm. The applicant has indeed noted a deterioration in the brazability of the assembly when the thickness of the titanium or titanium alloy is greater. The applicant explains this deterioration in the following way:

the titanium has the effect of increasing the temperature of the allotropic transformation of the alpha zirconium (compact hexagonal structure) into beta zirconium (centred cubic structure) from 865° C. (pure zirconium) to around 900° C., i.e. to a temperature clearly below the melting temperature of the brazing alloy (typically 750° C.-850° C.). Therefore, during the brazing, there is less risk of phase transformation in the zirconium or zirconium alloy coating. However, this leads to a fragmentation of the structure (increase in the number of grain boundaries) which promotes the diffusion of atoms coming from the brazing material (and in particular copper) and the titanium layer. Thus, by avoiding the allotropic transformation, an excessively rapid diffusion of copper to the zirconium is avoided, and the formation of fragilising compounds is thus limited.

if there is too much titanium (layer greater than 10 μm for the shapes we are interested in), a Zr—Ag—Cu—Ti alloy is created locally with a content capable of going beyond the eutectoid composition, and therefore with a risk of creation of a large number of fragilising intermetallic phases during cooling.

The shaping by plastic deformation of the coated parts is typically performed by rolling, calendering, stamping or spinning. The formed coated parts typically have dished, semi-cylindrical or other shapes. The operation for assembling the coated assembly parts, so as to produce a chemical device element, includes the formation of seams between said parts, typically by welding operations according to any known means, for example that described in U.S. Pat. No. 4,073,427 or WO 03 097230.

Another object of the invention is a zirconium or zirconium alloy sheet characterized in that it is coated on one of its surfaces with a titanium or titanium alloy layer, having a thickness typically between 1 and 10 μm, preferably between 2 and 10 μm, more preferably between 2 and 7 μm and even more preferably between 3 and 6 μm. Such a sheet is particularly suitable for forming zirconium-coated steel plates that are easy to shape by plastic deformation. With a thickness of less than 1 mm, or even less than 0.5 mm, and possibly less than or equal to 0.3 mm, these sheets make it possible to produce inexpensive chemical devices or chemical device elements.

Another object of the invention is a method for producing a zirconium or zirconium alloy sheet coated with a titanium or titanium alloy layer, having a thickness of typically between 1 and 10 μm, preferably between 2 and 10 μm, more preferably between 2 and 7 μm and even more preferably between 3 and 6 μm, characterised in that the titanium is deposited by cathode spraying in a chamber equipped with a cathode magnetron under a pressure of between $10^{-4}$ Torr and $10^{-2}$. Preferably, the zirconium or zirconium alloy sheet has previously been cleaned, degreased and the surface to be treated has been scoured by ionic scouring.

Another object of the invention is a steel plate coated with a zirconium or zirconium alloy layer, including a steel support layer (carbon steel or stainless steel) having a thickness typically and preferably between 1 mm and 50 mm, an intermediate titanium or titanium alloy layer and a zirconium or zirconium alloy layer, having a thickness typically and preferably less than 5 mm, preferably less than 1 mm, or even less than 0.5 mm, and possibly less than or equal to 0.3 mm.

Another object of the invention is a method for producing a steel plate coated with a zirconium or a zirconium alloy layer, which method includes the following steps:

(a) the formation of an assembly including a steel support part, a zirconium or zirconium alloy sheet, typically having dimensions similar to those of the steel plate, and at least one brazing material between the support part and the coating, wherein said brazing material is an alloy including silver and copper;

(b) the insertion of the initial assembly into a brazing chamber with a controlled atmosphere;

(c) the formation of a controlled atmosphere in said chamber;

(d) the reheating of said assembly to a temperature at least equal to the brazing temperature of said brazing material, so as to attach the zirconium sheet to the steel plate;

characterised in that, prior to the formation of said assembly, the deposition of a titanium or titanium alloy layer on said zirconium or zirconium alloy coating is performed, and in that said coating is placed so that its titanium- or titanium alloy-coated surface is in contact with said brazing material.

As indicated above, the zirconium or zirconium alloy coating has a thickness of less than 1 mm, or even less than 0.5 mm, and possibly less than or equal to 0.3 mm. The deposition can be performed by cathode spraying in a chamber equipped with a cathode magnetron under a pressure of between $10^{-4}$ Torr and $10^{-2}$ Torr. Other deposition techniques can be considered, such as a plasma-assisted PVD deposition or a "cold spray"-type thermal spray deposition, or plasma gun deposition under vacuum conditions. In all of these cases, the surface on which the deposition is performed has preferably previously been cleaned, degreased and possibly scoured by ionic scouring.

As indicated above, the brazing material is an alloy including silver and copper, preferably easy to find on the market, typically a Ag—Cu binary alloy having a composition similar to the eutectic composition (Ag 72%-Cu 28%), a ternary alloy also including zinc or a quaternary alloy including silver, copper, zinc and tin, for example Ag 55%, Zn 22%, Cu 21% and Sn 2%, or a quaternary alloy including silver, copper, zinc and cadmium, for example Ag 50%, Zn 16.5%, Cu 15.5 and Cd 18%.

As indicated above, the controlled atmosphere is preferably a relatively high vacuum: the chamber is typically pressurized at a pressure of between $10^{-3}$ and $10^{-1}$ Pa. However, in particular when the weld contains metals that have a tendency to sublime, such as tin or zinc (risk of contamination of the load or the furnace during the treatment), it is preferable to use a neutral gas such as argon, nitrogen or an argon-nitrogen mixture as the controlled atmosphere, under a partial pressure typically between $5\ 10^3$ and $10^4$ Pa.

As indicated above, the initial assembly is brought to a temperature below 900° C., preferably below the austenitisation temperature of the steel of the support. The method advantageously includes the application of a plating pressure (also referred to as initial pressure) on said assembly during all or some of the brazing operation, typically greater than 0.1 MPa.

Another object of the invention is a method for producing a chemical device element comprising a zirconium or zirconium alloy coating comprising at least one first and one second coated assembly part, wherein each coated assembly part includes a steel support part and at least one zirconium or zirconium alloy coating, which method is characterized in that it includes the following series of steps:

(a) the production of coated assembly parts according to the method of any one of claims 1 to 9;
(b) the shaping of said intermediate coated parts, typically by rolling, calendering, stamping or spinning, so as to obtain said coated assembly parts;
(c) the assembly of the coated assembly parts so as to obtain said chemical device element.

EXAMPLES

Production of a Titanium-Coated Zirconium Sheet

A sheet made of a Zr 702 zirconium-hafnium alloy (UNS reference R60702), having a thickness of 1 mm, with the length and width being selected on the basis of the steel sheet that it is intended to cover, typically 2 m*1 m, is obtained.

The zirconium-hafnium alloy sheet is degreased with an organic solvent. Then, an ionic scouring operation is performed on the surface so to be coated, using the same equipment as that used for the deposition.

A deposition of 5 μm of titanium is performed by cathode spraying of a pure (99.995%) Ti target.

Production of Chemical Device Elements

Three initial assemblies are produced. For each of them, the support sheet is made of stainless steel 316L (UNS reference S31603), having a thickness of 10 mm, a length of 2 m and a width of 1 m.

the first with a zirconium sheet identical to that described above, but not coated with titanium;

the second with a titanium-coated zirconium sheet identical to that described in the previous example, and a silver-copper brazing alloy (FIG. 2);

the third with a titanium-coated zirconium sheet identical to that described in the previous example, and a silver-copper-zinc-tin quaternary brazing alloy.

First Assembly—Outside of the Invention

The zirconium sheet is placed on the steel sheet. Previously, Ag 72%-Cu 28% alloy strips, degreased with an organic solvent, have been deposited on the steel sheet. These strips are placed so that they are located between the steel support and the zirconium coating. The steel sheet and the coating are held together by applying a pressure close to 0.1 MPa, i.e. 10 tons per square meter, using ties and clamping plates. The assembly is brazed in a furnace under vacuum, at a temperature of 830° C. and under a pressure of close to $5\ 10^{-5}$ mbar, that is, $5\ 10^{-3}$ Pa.

The coated sheet is slowly cooled, first by maintaining the vacuum until a plateau of around 600° C. is reached, then under a nitrogen atmosphere until around 500° C., then under air with forced convection until 200° C. The total cooling time is up to 48 hours.

In spite of these slow cooling conditions, a significant decohesion area is noted in the region of the interface between the weld and the zirconium sheet.

Next, samples are cut in the assembly in the region of this interface. These samples are then subjected to 900 folding tests with a radius of curvature of 20 mm. The folding only accentuates the defects already observed before deformation.

Second Assembly

The titanium-coated zirconium sheet produced in the first example is placed on the steel sheet, with the titanium surface opposite the steel sheet. Previously, Ag 72%-Cu 28% alloy strips, degreased with an organic solvent, have been deposited on the steel sheet. These strips are placed so that they are located between the steel support and the titanium layer of the zirconium coating.

The steel sheet and the coating are held together by applying a pressure close to 0.1 MPa, i.e. 10 tons per square meter, using ties and clamping plates. The assembly is brazed in a furnace under vacuum, at a temperature of 830° C. and under a pressure of close to $5\ 10^{-5}$ mbar, that is, $5\ 10^{-3}$ Pa.

The assembly is then slowly cooled, as described above for the first assembly.

FIG. 2 shows that the interface between the weld and the zirconium sheet is free of decohesion defects, owing to the presence of the titanium layer.

Next, samples are cut in the assembly in the region of this interface. These samples are then subjected to 90° folding tests with a radius of curvature of 20 mm. In spite of this additional deformation, no decohesion appears.

Third Assembly

The titanium-coated zirconium sheet produced in the first example is placed on the steel sheet, with the titanium surface opposite the steel sheet. Previously, Ag 55%-Cu 21%-Zn 22%-Sn 2% quaternary alloy strips have been deposited on the steel sheet. These strips have been degreased with an organic solvent and are placed so that they are located between the steel support and the titanium layer of the zirconium coating.

The steel sheet and the coating are held together by applying a pressure close to 0.1 MPa using ties and clamping plates. The assembly is brazed in a furnace under vacuum, at a temperature of 750° C. and under partial argon pressure, on the order of 90 mbar, i.e. $9 \cdot 10^3$ Pa.

Next, the assembly is cooled for 48 hours. The assembly is then bent so as to form a semi-cylindrical shell having a radius of 250 mm. The cylindrical shell is then joined to another semi-cylindrical shell according to one of the techniques described in U.S. Pat. No. 4,073,427 or WO 03 097230.

The invention claimed is:

1. A method for producing coated assembly parts intended for the production of a chemical or nuclear device element comprising a zirconium or zirconium alloy coating, wherein said assembly parts include a steel support part and at least one zirconium or zirconium alloy coating, the method consisting essentially of:
    (a) forming an initial assembly including a steel support part, a zirconium or zirconium alloy coating, and at least one brazing material between the support part and the coating, wherein said brazing material is an alloy including silver and copper;
    (b) inserting the initial assembly into a brazing chamber with a controlled atmosphere;
    (c) forming a controlled atmosphere in said chamber; and
    (d) reheating said assembly to a temperature at least equal to the melting temperature of said brazing material, so as to attach the zirconium coating to the support part;
    wherein prior to forming said initial assembly, a titanium or titanium alloy layer is deposited on said zirconium or zirconium alloy coating, and wherein said coating is placed so that the titanium- or titanium alloy-coated surface thereof is in contact with said brazing material, and
    wherein said brazing material includes silver and copper and is at least one selected from the group consisting of binary alloys having a eutectic composition with Ag between 67% and 75%, Ag—Cu—Zn ternary alloys, Ag—Cu—Zn—Sn quaternary alloys, and Ag—Cu—Zn—Cd quaternary alloys, wherein the brazing temperature is lower than the austenitisation temperature of the steel of the support.

2. The production method according to claim 1, wherein the zirconium or zirconium alloy coating has a thickness of less than 5 mm.

3. The production method according to claim 1, wherein said titanium or titanium alloy layer is deposited on said zirconium or zirconium alloy coating so that the titanium or titanium alloy layer has a thickness of up to 50 μm.

4. The production method according to claim 1, wherein the titanium deposition is performed on the zirconium or zirconium alloy coating by a method selected from the group consisting of: cathode spraying, plasma assisted physical vapour deposition, chemical vapour deposition, "cold spray"-type thermal spray deposition, plasma gun in vacuum conditions, wherein the surface of the zirconium coating has previously been washed, degreased and/or scoured by ionic scouring.

5. The production method according to claim 1, wherein said brazing material is placed between said support and said zirconium coating in the form of strips or a mesh.

6. The production method according to claim 1, wherein the initial assembly is inserted into a brazing chamber under vacuum and in which a pressure of between $10^{-3}$ and $10^{-1}$ Pa is established.

7. The production method according to claim 1, wherein the brazing material includes tin or zinc, and in which the initial assembly is inserted into a brazing chamber under a controlled atmosphere, under a pressure of between $5 \cdot 10^3$ and $10^4$ Pa.

8. The production method according to claim 1, wherein the initial assembly is subjected during the brazing to a plating pressure at least equal to 0.1 MPa.

9. A method for producing a steel plate coated with a zirconium or zirconium alloy layer, consisting essentially of:
    (a) forming an initial assembly including a steel support part, a zirconium or zirconium alloy sheet coating, having dimensions of the steel part, and at least one brazing material between the support part and the coating, wherein said brazing material is an alloy including silver and copper;
    (b) inserting the initial assembly into a brazing chamber with a controlled atmosphere;
    (c) forming a controlled atmosphere in said chamber;
    (d) reheating said assembly to a temperature at least equal to the brazing temperature of said brazing material, so as to attach the zirconium sheet to the steel part;
    wherein prior to forming said initial assembly, a titanium or titanium alloy layer is deposited on said zirconium or zirconium alloy coating, wherein said coating is placed so that a titanium- or titanium alloy-coated surface thereof is in contact with said brazing material, and
    wherein said brazing material includes silver and copper and is at least one selected from the group consisting of binary alloys having a eutectic composition with Ag between 67% and 75%, Ag—Cu—Zn ternary alloys, Ag—Cu—Zn—Sn quaternary alloys, and Ag—Cu—Zn—Cd quaternary alloys, wherein the brazing temperature is lower than the austenitisation temperature of the steel of the support.

10. The method according to claim 4, wherein the titanium deposition is performed on the zirconium or zirconium alloy coating by cold spray-type thermal spray deposition.

11. The production method according to claim 1, wherein the zirconium or zirconium alloy coating has a thickness of less than 1 mm.

12. The production method according to claim 1, wherein the zirconium or zirconium alloy coating has a thickness of less than 0.5 mm.

13. The production method according to claim 1, wherein the zirconium or zirconium alloy coating as a thickness of less than 0.3 mm.

\* \* \* \* \*